United States Patent Office  3,778,386
Patented Dec. 11, 1973

3,778,386
OXIDATION CATALYST FOR OXIDATION OF OLEFINS TO UNSATURATED ALDEHYDES
Shigeo Takenaka, Yasuji Kido, Tatsutoshi Shimabara, and Masanobu Ogawa, Takasaki, Japan, assignors to Nippon Kayaku Co., Ltd., Tokyo, Japan
No Drawing. Filed Apr. 24, 1970, Ser. No. 31,757
Claims priority, application Japan, May 2, 1969, 44/33,597
Int. Cl. B01j 11/82
U.S. Cl. 252—432                                   4 Claims

ABSTRACT OF THE DISCLOSURE

The preparation of an oxidation catalyst is described, represented by the following general formula:

$$Ni_aCo_bFe_cBi_dL_eM_hMo_fO_g$$

in which L is phosphorous, arsenic or boron and M is potassium, rubidium or cesium; and wherein $a$ and $b$ have a value of from 0 to 15, $a+b$ being 2 to 15, $c$ is 0.5 to 7, $d$ is 0.1 to 4, $e$ is 0 to 4, $f$ is 12, $g$ is 35 to 85 and $h$ is 0.01 to 0.5. The oxidation catalyst is useful in a process to produce acrolein by oxidizing propylene in vapor phase.

BACKGROUND OF THE INVENTION

Previous attempts to produce unsaturated aldehydes by vapor phase oxidation of propylene, similar to the present invention, are disclosed in U.S. Pat. No. 3,454,630 and Canadian Pat. No. 781,513.

In U.S. Pat. No. 3,454,630, propylene is oxidized to produce acrolein by the use of a catalyst represented by the formula Ni,Co,Fe,Bi,P,Mo,O and the maximum single pass yield [1] of acrolein is 71 percent. In Canadian Pat. 781,513, the maximum single pass yield of acrolein amounts to 75.5 percent by the use mainly of a catalyst represented by the formula Ni, Co, Fe, Bi, As, Mo, O. A major objective of this invention is to provide a catalyst which, when used in a process of oxidizing propylene to acrolein, is capable of attaining an increased acrolein yield.

BRIEF DESCRIPTION OF THE INVENTION

The present invention has been accomplished as a result of various studies to further raise the single pass yield of acrolein. The present catalyst is distinctive, among other reasons, because it contains potassium, rubidium or cesium. In accordance with the invention, oxidation of propylene to acrylic acid, carbon monoxide, carbon dioxide, etc., is inhibited and a single pass yield of acrolein of up to 88 percent is achieved.

The present catalyst comprises the elements of the following general formula, on a suitable carrier or binder:

$$Ni_aCo_bFe_cBi_dL_eM_hMo_fO_g$$

[1] In this specification, the terms conversion of propylene (C), selectivity of acrolein (S), single pass yield of acrolein (C×S) and single pass yield of acrylic acid are defined as follows:

Conversion of propylene (C)
$$= \frac{\text{mols of propylene reacted}}{\text{mols of propylene supplied}} \times 100$$

Selectivity of acrolein (S)
$$= \frac{\text{mols of acrolein formed}}{\text{mols of propylene reacted}} \times 100$$

Single pass yield of acrolein (C×S)
$$= \frac{\text{mols of acrolein formed}}{\text{mols of propylene supplied}} \times 100$$

Single pass yield of acrylic acid
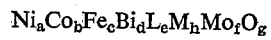
$$= \frac{\text{mols of acrylic acid formed}}{\text{mols of propylene supplied}} \times 100$$

wherein Ni,Co,Fe,Bi,Mo and O are the elements nickel, cobalt, iron, bismuth, molybdenum and oxygen, respectively; L is phosphorous, arsenic or boron, including mixtures; and M is potassium, rubidium or cesium, including mixtures; and wherein $a$ and $b$ are 0 to 15, while $a$ plus $b$ is 2 to 15, $c$ is 0.5 to 7, $d$ is 0.1 to 4, $e$ is 0 to 4, $f$ is 12, $g$ is 35 to 85 and $h$ is 0.01 to 0.5.

Of the above compositions, suitable preferred catalysts are as follows: (1) when $b$ is 0, then $a$ is 3–11, $c$ is 1–3, $d$ is 1–3, $e$ is 0.5–1, $f$ is 12, $g$ is 45–70 and $h$ is 0.1–0.3; (2) when $a$ is 0, then $b$ is 2–7, and the remaining are as in (1); (3) and when neither $a$ nor $b$ is 0, then $a$ plus $b$ is 2–11, $a$ is less than 11, $b$ is less than 7, and the remaining are as in (1) and (2).

The present catalyst may be prepared by any suitable method of combining the various metals or metal oxides, preferably with a binder or on a carrier. A suitable procedure is to form a slurry or solution of compounds in proper proportions, for example, by adding to an aqueous molybdate solution, such as ammonium molybdate, an L compound, such as phosphoric, arsenic or boric acid, and an M compound, such as potassium, rubidium or cesium nitrate, and then by adding water-soluble compounds of nickel, cobalt, iron and bismuth, as the occasion demands.

A suitable carrier may then be added to the slurry-like suspension, which is then heated to dryness to form a cake. The cake may be pelleted and calcined to provide the final catalyst.

In place of ammonium molybdate, molybdenum oxide or molybdic acid may be used to provide Mo. Potassium molybdate may be used to provide both Mo and M. The remaining metals, nickel, cobalt, iron and bismuth, may be provided as nitrates.

Since there is no particular merit even if two or more of potassium, rubidium and cesium are used in mixture, the use of potassium is most desirable from the industrial point of view and rubidium or cesium has a disadvantage in cost.

The catalyst of the invention is preferably incorporated on a carrier material, such as silica, silicon carbide or alumina. Silica gel or silica sol is particularly suitable. The catalyst is preferably in the form of grain or tablet. Generally, the catalyst is employed as a fixed bed, but it may be a moving bed or fluidized bed, as well.

The catalytic oxidation reaction of the invention is carried by the oxidation of olefins, such as propylene or isobutylene, to unsaturated aldehydes, at a temperature of 250–500° C. and at a pressure of 0.5–10 atm. The contact time of propylene, air and steam is 0.5–8 seconds under normal pressure. The gaseous mixture to be passed over the catalyst is prepared by mixing propylene, air and steam so as to give a proportion of 0.5–4 mols of oxygen and 1–20 mols of water to 1 mol of propylene. A particularly suitable molar ratio of the feed gas is:

|  | Mols |
|---|---|
| Propylene | 1 |
| Air | 8–15 |
| Steam | 1–6 |

The following examples are given in order to illustrate the invention without limiting the same.

Example 1

8.7 g. of nickel nitrate were dissolved in 5 ml. of distilled water, 26.2 g. of cobalt nitrate in 10 ml. of distiller water, 24.2 g. of ferric nitrate in 8 ml. of distilled water, 14.5 g. of bismuth nitrate in 10 ml. of distilled water acidified with 3 ml. of concentrated nitric acid, and the four nitrate solutions were mixed.

On the other hand, a solution of 7.0 g. of phosphoric acid (85%) and 0.67 g. of potassium nitrate in 5 ml.

of distilled water was added to an aqueous solution of 63.6 g. of ammonium molybdate dissolved in 64 ml. of distilled water to obtain a light yellow aqueous solution to which the foregoing nitrate solution was then added.

17 g. of silica sol (as $SiO_2$) were added to the thus obtained slurry-like suspension, heated to dryness, further heated to a high temperature, cooled and pulverized. The resulting powder was pelleted and sintered at 500° C. in the air for 6 hours to obtain a catalyst represented by $Ni_1Co_3Fe_2Bi_1P_2K_{0.2}Mo_{12}O_{49.6}$ (Catalyst No. 1).

Example 2

The procedures described in Example 1 were repeated except that 10.3 g. of arsenic acid were used in place of the phosphoric acid. The resulting catalyst had a composition of $Ni_1Co_3Fe_2Bi_1As_{1.5}K_{0.2}Mo_{12}O_{48.35}$ (Catalyst No. 2).

Example 3

The procedures described in Example 1 were repeated except that 4.4 g. of boric acid were used in place of the phosphoric acid. The resulting catalyst had a composition of $$Ni_1Co_3Fe_2Bi_1B_2K_{0.2}Mo_{12}O_{49.6}$$

(Catalyst No. 3).

Example 4

The procedures described in Example 1 were repeated except that 1.9 g. of rubidium nitrate were used in place of the potassium nitrate. The resulting catalyst had a composition of $Ni_1Co_3Fe_2Bi_1P_2Rb_{0.4}Mo_{12}O_{49.75}$ (Catalyst No. 4).

Example 5

The procedures described in Example 1 were repeated except that 2.6 g. of cesium nitrate were used in place of the potassium nitrate to thus prepare a catalyst having the composition of $Ni_1Co_3Fe_2Bi_1P_2Cs_{0.4}Mo_{12}O_{49.9}$ (Catalyst No. 5).

Examples 6-12

The catalysts as shown in Table 1 were prepared by the procedures described in Example 1. The amounts of the raw materials used are shown in Table 1. The compositions of the resulting catalysts are given in Table 1a.

TABLE 1

| Example No. | Grams | | | | | | | Nitric acid (ml.) | Silicasol ($SiO_2$) |
|---|---|---|---|---|---|---|---|---|---|
| | Nickel nitrate | Cobalt nitrate | Ferric nitrate | Bismuth nitrate | Phosphoric acid | Potassium nitrate | Ammonium molybdate | | |
| 6 | 8.7 | 26.2 | 24.2 | 14.5 | 3.5 | 0.33 | 63.6 | 3 | 17 |
| 7 | 8.7 | 26.2 | 24.2 | 14.5 | 10.5 | 0.99 | 63.6 | 3 | 17 |
| 8 |  | 61.2 | 12.1 | 7.3 | 3.5 | 0.33 | 63.6 | 1.5 | 16.7 |
| 9 | 95.7 |  |  | 12.1 | 7.3 | 3.5 | 0.33 | 63.6 | 1.5 | 18.6 |
| 10 | 26.1 | 43.7 | 36.3 | 14.5 | 3.5 | 0.33 | 63.6 | 3.0 | 19.0 |
| 11 | 26.1 | 43.7 | 36.3 | 43.5 | 3.5 | 0.33 | 63.6 | 3.0 | 21.9 |
| 12 | 34.8 | 52.4 | 72.7 | 14.5 | 3.5 | 0.33 | 63.6 | 3.0 | 34.6 |

TABLE 1a

| Example No. | Composition of catalyst |
|---|---|
| 6 | $Ni_1, Co_3, Fe_2, Bi_1, P_1, K_{0.1}, Mo_{12}, O_{47.01}$ |
| 7 | $Ni_1, Co_3, Fe_2, Bi_1, P_3, K_{0.3}, Mo_{12}, O_{52.15}$ |
| 8 | $Co_7, Fe_1, Bi_{0.5}, P_1, K_{0.1}, Mo_{12}, O_{47.80}$ |
| 9 | $Ni_{11}, Fe_1, Bi_{0.5}, P_1, K_{0.1}, Mo_{12}, O_{51.80}$ |
| 10 | $Ni_3, Co_5, Fe_3, Bi_1, P_1, K_{0.1}, Mo_{12}, O_{52.55}$ |
| 11 | $Ni_3, Co_5, Fe_3, Bi_3, P_1, K_{0.1}, Mo_{12}, O_{55.55}$ |
| 12 | $Ni_4, Co_6, Fe_6, Bi_1, P_1, K_{0.1}, Mo_{12}, O_{59.05}$ |

Example 13

80 ml. of the catalyst obtained in Example 1, having the composition of $Ni_1Co_3Fe_2Bi_1P_2K_{0.2}Mo_{12}O_{49.6}$ was filled in a reactor having an inner diameter of 20 mm., immersed in a niter bath and subjected to reaction under the following conditions:

| | |
|---|---|
| Niter bath temperature, ° C. | 305 |
| Propylene:air:steam (mol) | 1:10:5 |
| Contact time, seconds | 1.5 |

The results were

| | Percent |
|---|---|
| Conversion of propylene | 96 |
| Selectivity of acrolein | 92 |
| Single pass yield of acrolein | 88 |
| Single pass yield of acrylic acid | 3 |

In addition, small amounts of carbon monoxide, carbon dioxide and acetic acid were formed as byproducts.

Examples 14 to 23

The procedures similar to that described in Example 13 were repeated except the conditions shown in Table 2 to obtain the results of Table 2.

TABLE 2

| Example No. | Catalyst No. | Composition of the catalysts | Bath temp. (° C.) | Contact time (sec.) | Percent | | | Single pass yield of acrylic acid |
|---|---|---|---|---|---|---|---|---|
| | | | | | Conversion of propylene | Selectivity of acrolein | Single pass yield of acrolein | |
| 13 | 2 | $Ni_1Co_3Fe_2Bi_1As_{1.5}K_{0.2}Mo_{12}O_{48.35}$ | 305 | 1.5 | 94 | 93 | 87 | 4 |
| 14 | 3 | $Ni_1Co_3Fe_2Bi_1B_2K_{0.2}Mo_{12}O_{49.6}$ | 310 | 1.5 | 95 | 86 | 82 | 6 |
| 15 | 4 | $Ni_1Co_3Fe_2Bi_1P_2Rb_{0.4}Mo_{12}O_{49.75}$ | 310 | 1.5 | 95 | 89 | 84 | 5 |
| 16 | 5 | $Ni_1Co_3Fe_2Bi_1P_2Cs_{0.4}Mo_{12}O_{49.9}$ | 320 | 1.5 | 93 | 86 | 80 | 7 |
| 17 | 6 | $Ni_1Co_3Fe_2Bi_1P_1K_{0.1}Mo_{12}O_{47.01}$ | 305 | 1.5 | 95 | 90 | 85 | 4 |
| 18 | 7 | $Ni_1Co_3Fe_2Bi_1P_3K_{0.3}Mo_{12}O_{52.15}$ | 315 | 1.5 | 95 | 85 | 81 | 5 |
| 19 | 8 | $Co_7Fe_1Bi_{0.5}P_1K_{0.1}Mo_{12}O_{47.80}$ | 320 | 1.5 | 95 | 86 | 82 | 5 |
| 20 | 9 | $Ni_{11}Fe_1Bi_{0.5}P_1K_{0.1}Mo_{12}O_{51.80}$ | 310 | 1.5 | 96 | 87 | 83 | 6 |
| 21 | 10 | $Ni_3Co_5Fe_3Bi_1P_1K_{0.1}Mo_{12}O_{52.55}$ | 305 | 1.6 | 95 | 91 | 86 | 4 |
| 22 | 11 | $Ni_3Co_5Fe_3Bi_3P_1K_{0.1}Mo_{55.55}$ | 325 | 1.5 | 95 | 89 | 84 | 5 |
| 23 | 12 | $Ni_4Co_6Fe_6Bi_1P_1K_{0.1}Mo_{12}O_{59.05}$ | 315 | 1.5 | 96 | 83 | 80 | 10 |

What is claimed is:

1. An olefin oxidation catalyst represented by the general formula,

$$Ni_aCo_bFe_cBi_dB_eM_hMo_fO_g$$

in which Ni, Co, Fe, Bi, B, Mo and O are respectively elements of nickel, cobalt, iron, bismuth, boron, molybdenum and oxygen; M is at least one element selected from the group consisting of potassium, rubidium and cesium; $a$, $b$, $c$, $d$, $e$, $f$, $g$ and $h$ are respectively numbers of atoms of Ni, Co, Fe, Bi, B, Mo, O and M; and wherein $a$ and $b$ are 0 to 15 $a$ plus $b$ is 2 to 15, $c$ is 0.5 to 7, $d$ is 0.1 to 4, $e$ is 0.5 to 4, $f$ is 12, $g$ is 35 to 85 and $h$ is 0.01 to 0.5.

2. The olefin oxidation catalyst of claim 1, wherein $a$ is 3 to 11, $b$ is 0, $c$ is 1 to 3, $d$ is 1 to 3, $e$ is 0.5 to 1, $f$ is 12, $g$ is 45 to 70, and $h$ is 0.1 to 0.3.

3. The olefin oxidation catalyst of claim 1, wherein $a$ is 0, $b$ is 2 to 7, $c$ is 1 to 3, $d$ is 1 to 3, $e$ is 0.5 to 1, $f$ is 12, $g$ is 45 to 70 and $h$ is 0.1 to 0.3.

4. The olefin oxidation catalyst of claim 1, wherein $a$ is less than 11, $b$ is less than 7 but neither $a$ nor $b$ is 0, $a$ plus $b$ is 2 to 11, $c$ is 1 to 3, $d$ is 1 to 3, $e$ is 0.5 to 1. $f$ is 12, $g$ is 45 to 70, and $h$ is 0.1 to 0.3.

References Cited
UNITED STATES PATENTS

| | | | |
|---|---|---|---|
| 3,454,630 | 7/1969 | Yamaguchi et al. | 252—437 X |
| 3,471,556 | 10/1969 | Yamaguchi et al. | 252—437 X |
| 3,576,764 | 4/1971 | Yamaguchi et al. | 252—437 |
| 3,288,721 | 11/1966 | Kerr | 252—437 X |
| 3,446,840 | 5/1969 | Kato et al. | 252—432 X |
| 3,522,299 | 7/1970 | Takenaka et al. | 252—470 X |
| 3,642,930 | 2/1972 | Grasselli et al. | 252—470 X |

PATRICK P. GARVIN, Primary Examiner

U.S. Cl. X.R.

252—437, 470; 260—604 R